Patented Aug. 17, 1954

2,686,805

UNITED STATES PATENT OFFICE 2,686,805

DICARBOXYLIC ACID ESTERS OF 3,5-DIALKOXY-1-ALKANOLS, 3,5,X-POLYALKOXY-1-ALKANOLS AND MIXTURES OF SAID ALKANOLS

Samuel A. Glickman and Joseph M. Wilkinson, Easton, Pa., assignors to General Aniline & Film Corporation, New York, N. Y., a corporation of Delaware No Drawing. Application May 21, 1951, Serial No. 227,539

6 Claims. (Cl. 260—475)

This invention relates to dicarboxylic acid esters of 3,5-dialkoxy-1-alkanols, 3,5,x-polyalkoxy-1-alkanols, and mixtures of said alkanols, and to vinyl resins, cellulose ether and ester compositions containing the same.

A large number of organic esters are known, some of which are utilized as plasticizers for cellulose ether and ester compositions. The most important properties of any plasticizer should be compatibility with vinyl resins, cellulose ether and cellulose ester compositions, low volatility, and water resistance. If a plasticizer were not completely compatible in the proportions generally used with vinyl resins, cellulose ether or ester, the plasticizer will be found to have immediately exuded from the film or molded piece giving generally an opaque appearance and oily feel. Sometimes this occurs only after the article or film is allowed to stand. In either case, the vinyl resins, cellulose ether or ester reverts to its original hardness and brittleness. The same thing holds true of low boiling plasticizers. If they boil off slowly on standing or at temperatures to which the vinyl resin or cellulose ester is subjected either in preparation or use, the cast film or molded article again becomes brittle and may easily crack or break. Films, lacquers, and molded articles are often subjected to water in their use. If the plasticizer is water soluble to even a small extent, the plasticizer is leached out of the vinyl resin or cellulose ester which then becomes hard and brittle. Other properties which may be desired of a plasticizer will depend on their end use. Some plasticizers will impart resistance to flammability, oils, greases, and weathering. For example, triphenyl phosphate is commonly used where fire resistance is desired. Some plasticizers discolor badly or oxidize to give off objectionable odors.

No one plasticizer seems to be a cure-all for defects in use. This is probably the reason why several hundred plasticizers have been suggested. However, the majority generally fail in one or more of the previously mentioned necessary properties of compatibility, low volatility, and water resistance.

Most of the plasticizers currently used have the tendency when incorporated into a vinyl resin, cellulose ether or ester to oxidize. This oxidation produces discoloration and objectionable odors. The discoloration or further yellowing often results at processing temperatures due to the poor stability of the plasticizer. Dimension stability is not maintained because of the excessive absorption of water brought on by some plasticizers. These defects, either individually or collectively, render the vinyl resin, cellulose ether or ester composition of little or no value for their intended use.

Of the large number of plasticizers available, the following esters have reached commercial acceptance:

Triacetin (glyceryl triacetate)
Dibutyltartrate
Methoxyethyl adipate
Methoxyethyl oleate
Triphenyl phosphate
Methylphthalyl ethylglycolate
Dimethylphthalate
Dimethoxyethylphthalate
Dibutoxyethylphthalate
Butyl cellosolve stearate
3-methoxybutyl acetate
Butoxyethylacetacetate The foregoing esters have not been accepted with complete satisfaction, however, because of their various defects, the principal one being that the esters evaporate from the vinyl resin, cellulose ether and ester composition due to the inherent volatility of the plasticizer resulting in embrittlement on aging, poor flexibility at low temperatures which limits the usefulness of the cellulose ester composition. Moreover, they possess the objectionable property of yellowing the vinyl resin or cellulose ether and ester composition when such composition is exposed to elevated temperatures of manufacture, develop objectionable odors through oxidation of the plasticizer on aging, and are readily leached from the plasticized composition or contact with water.

It is an object of the present invention to provide dicarboxylic acid esters of 3,5-dialkoxy-1-alkanols, 3,5,x-polyalkoxy-1-alkanols, and mixtures of such alkanols which are not only compatible with the usual vinyl resin, cellulose ether and ester compositions but display unusually low volatility and water resistance.

Other objects and advantages will appear hereinafter.

The foregoing objects are accomplished by reacting a slight excess of a 3,5-dialkoxy-1-alkanol, 3,5,x-polyalkoxy-1-alkanol, or mixtures of such alkanols with an organic dicarboxylic acid in the presence of one mol per cent or less of an acidic catalyst, such as sulfuric and hydrochloric acid, preferably p-toluenesulfonic acid, at a temperature range of 120–150° C. under conditions leading to the removal of water by distillation.

The foregoing alkanols are characterized by the following general formula:

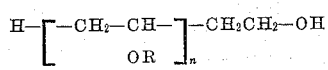

wherein R represents an alkyl, such as methyl, ethyl, propyl, isopropyl, butyl, isobutyl, hexyl, and the like, aryl, e. g., phenyl, naphthyl, tolyl, and the like, aralkl, e. g., benzyl, phenethyl, menaphthyl, and the like, or alkoxyalkyl, such as methoxymethyl, methoxyethyl, methoxypropyl, methoxybutyl, ethoxyethyl, ethoxypropyl, ethoxybutyl, propoxymethyl, propoxyethyl, propoxybutyl, butoxymethyl, butoxyethyl, butoxypropyl, and the like, and $n$ represents a positive integer ranging from 2 to 10.

The dialkoxy-1-alkanols and polyalkoxy-1-alkanols characterized by the foregoing formula are prepared according to the procedure described in the application of Samuel A. Glickman, Serial No. 206,519, filed January 17, 1951, now United States Patent 2,618,663, issued on November 18, 1952, and entitled "Production of Polyether Alcohols," by simultaneously hydrolyzing and reducing polyether alkanol acetals to corresponding polyether alcohols in an aqueous solution containing catalytic quantities of hydrolyzable salts of mineral and organic acids in conjunction with Raney nickel catalyst and hydrogen at moderate temperatures and pressures.

It is to be noted that the properties of the 3,5-dialkoxy and 3,5,x-polyalkoxy-1-alkanols prepared according to the process disclosed in the aforementioned application, which hereinafter will be referred to as 3,5,x-polyalkoxy-1-alkanols to indicate that an alkoxy group is on alternate carbon atoms of the alcohol, will vary with the nature of the alkoxy groups. These alkanols are colorless liquids characterized by complete miscibility in organic solvents, such as aliphatic alcohols, ketones, esters, glycol ethers, aromatic solvents, and aliphatic petroleum ethers and naphthas. The complete miscibility in aliphatic hydrocarbons is in sharp distinction to the polyethylene glycols which are virtually insoluble in these solvents. It can be readily seen that the solvent applications of these di- and polyalkoxy-1-alkanols are numerous. These materials may serve as effective replacements for the polyethylene glycols and lower glycols in applications where low hygroscopicity, wide solvent power and lower viscosity are of value.

In physical properties, the 3,5,x-polyalkoxy-1-alkanols rather closely resemble the polyethylene glycol ethers and it has been found that the corresponding polyethoxy-1-alkanols rather closely resemble the propylene glycol ethers since they are somewhat less water soluble, i. e., not completely water soluble, than the corresponding polymethoxy-1-alkanols. As the molecular weight of the alkoxy groups of the alkanols increases, the water solubility of the compounds decreases, and it has been found that the 3,5,x-polybutoxyalkanols are quite water soluble although the corresponding 3,5,x-methoxypolyalkanols are completely water soluble.

As examples of dicarboxylic acids ranging from 6 to 12 carbon atoms which can be esterified with the alkanols characterized by the above formula, the following are given:

Adipic, HOOC—(CH$_2$)$_4$—COOH
Pimelic, HOOC—(CH$_2$)$_5$—COOH
Suberic, HOOC—(CH$_2$)$_6$—COOH
Azelaic, HOOC—(CH$_2$)$_7$—COOH
Sebacic, HOOC—(CH$_2$)$_8$—COOH
Hendecanedioic, HOOC—(CH$_2$)$_9$—COOH
Dodecanedioic, HOOC—(CH$_2$)$_{10}$—COOH Aromatic dibasic acids, such as phthalic, isophthalic, terephthalic, diphenic, pyrocholoridanic, or the anhydride and substitution products of phthalic acid, such as:

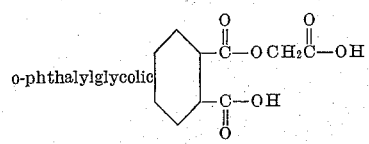

o-phthalylglycolic may also be employed.

When these acids are esterified with the foregoing alkanols, the esters obtained exhibit more favorable properties with respect to volatility and water extractability than many of the presently available commercial plasticizers. The esters show an excellent range of compatibility with stock vinyl resins, such as polymers of vinyl chloride, copolymers of vinyl chloride and vinyl acetate, cellulose ether and cellulose ester compositions. The compatability results in improved ease of milling the polyvinyl and cellulosic sheets and the compounding of molding and casting solutions. In particular, the esters confer low temperature flex properties to the plasticized films. This feature is exceedingly important since brittleness of films at low temperatures is a drawback to the use of many resins and films therefrom. Vinyl resins and cellulose ether and ester films employing the esters prepared in accordance with the present invention show excellent properties with regard to the absence of "bloom," which is characterized by the exudation of the plasticizer from the film and results in brittleness and poor appearance of the films. Vinyl resins, cellulose esters, mixed cellulose esters, and cellulose ethers plasticized with the esters of the present invention show an exceedingly high degree of water resistance which is superior to many of the presently employed plasticizers. The characteristics imparted by the esters of the present invention to vinyl resins, cellulose ether and ester compositions, as will be illustrated hereinafter, are believed to arise from the structure of the alcohol containing a straight chain carbon skeleton with appending ether side chains. These ether linkages provide a high degree of association with the vinyl resin, cellulose ether and ester composition, thus conferring many of the beneficial attributes imparted by these esters.

As pointed out above, the esters are prepared by esterifying a slight excess of the alkanol with a dicarboxylic acid of from 6 to 12 carbon atoms in the presence of an acidic catalyst. The use of a water azeotroping solvent, such as benzene or toluene, may be employed in the esterification since it affords a smooth reaction with lower operating temperatures, less color formation, more rapid removal of water, and better yields than those reactions in which such a solvent is absent. The use of decolorizing carbon either at the beginning of the esterification reaction or in the working up procedure yields faintly colored solutions. The latter is an important feature since it dispenses with the distillation of the ester, particularly the high molecular esters. The esters prepared in accordance with the present invention are characterized by the following general formula:

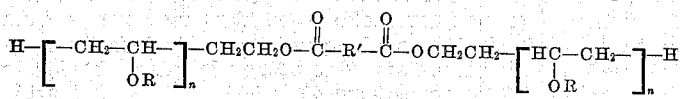

wherein R and $n$ have the same values as above, and R' represents a member selected from the class consisting of polymethylene chains of from 4 to 10 carbon atoms and the residues of dicarboxylic acids of the benzene and naphthalene series. By residue is meant that portion of the dicarboxylic acid which carries the two carboxyl groups thereof, in other words, the residue to which the two carboxyl groups are attached in the free acid.

The following examples will serve to illustrate certain ways in which the dicarboxylic acids are esterified with the 3,5-dialkoxy-, and 3,5,x-polyalkoxy-1-alkanol, and mixture of such alkanols to form the esters which are applied as plasticizers for cellulose ether and cellulose ester compositions. It is to be clearly understood that these examples are not to be construed in any way as limiting the invention.

*Example I*

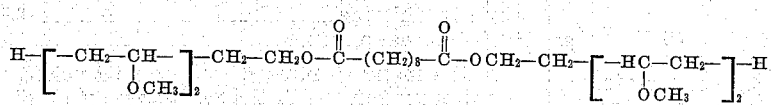

bis-3,5-dimethoxyhexylsebacate 90 parts of 3,5-dimethoxy-1-hexanol (prepared according to Example I of the aforestated patent application) were placed in a glass reactor with 51 parts of sebacic acid and 0.1 part of p-toluenesulfonic acid. The mixture was heated in a nitrogen atmosphere at 120–150° C. for 3 hours at the end of which time the distillation of water was practically complete. The cooled liquid was taken up in a suitable solvent, washed with dilute soda solution followed by distillation at reduced pressure. There were obtained 90 parts of bis-3,5-dimethoxyhexyl sebacate boiling at 210–215° C. at 0.2 mm. (mercury gauge), $n_D^{25}$ 1.4499, $d_4^{25}$ 0.9994. The calculated analytical figures for $C_{26}H_{50}O_8$ are carbon per cent 63.63, hydrogen per cent 10.27, found carbon per cent 63.77, hydrogen per cent 10.38. The yield is 73% of the theoretical.

*Example II*

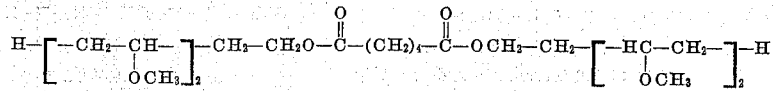

bis-3,5-dimethoxyhexyl adipate

The procedure of Example I was followed with the exception that 51 parts of sebacic acid were replaced by 37 parts of adipic acid. There was obtained bis-3,5-dimethoxyhexyl adipate, boiling point 195–198° C. at 0.2 mm. (mercury gauge), $n_D^{25}$ 1.4482, $d_4^{25}$ 1.0240. The calculated analytical figures for $C_{22}H_{42}O_8$ are carbon per cent 60.81, hydrogen per cent 9.74, found carbon per cent 60.68, and hydrogen per cent 9.84.

*Example III*

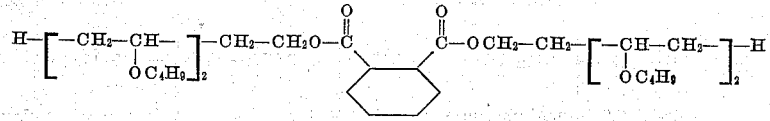

bis-3,5-dibutoxyhexyl phthalate 3,5-dibutoxyhexanol was prepared by following the general procedure of the aforestated application by subjecting 146 parts of 3,5-dibutoxy-1-hexanal, dibutyl acetal, 27 parts of water, 1 part of p-toluenesulfonic acid, and 15 parts of Raney nickel to hydrolysis reduction at 1000 lbs. per square inch at 90–95° C. The mixture was filtered from Raney nickel and distilled. The 3,5-dibutoxyhexanol boiled at 98–99° C. at 0.3 mm.; $n_D^{25}$ 1.4381, $d_4^{25}$ 0.9069.

97 parts of dimethylphthalate, 1 part of anhydrous sodium methoxide and 246 parts of 3,5-dibutoxyhexanol were placed in a glass reactor with an attached fractionating column. The contents were heated at 120–140° C. for 4 hours during which time there were collected 30 parts of methanol. The residue was subjected to vacuum distillation yielding 280 parts of bis-3,5-dibutoxyhexyl phthalate, boiling point of 210–215° C. at 0.1 mm.

*Example IV*

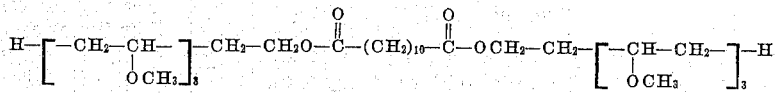

3,5,7-trimethoxyoctyl dodecanedioate 55 parts of 3,5,7-trimethoxy octanol (prepared according to Example V of the said application), 29 parts of dodecanedioic acid, 125 parts of toluene, and 0.5 part of p-toluenesulfonic acid were replaced in a glass reactor equipped with a constant water separator. The mixture was heated at 120–125° C. for 1 to 2 hours during which time the theoretical amount of water was collected. The cooled mixture was treated with dilute soda solution and distilled at reduced pressure. There were obtained 60 parts of 3,5,7-trimethoxyoctyl dodecanedioate, boiling point of 245° C. at 0.1 mm. (mercury gauge), $n_D^{25}$ 1.4510. The yield is 75% of the theoretical.

*Example V*

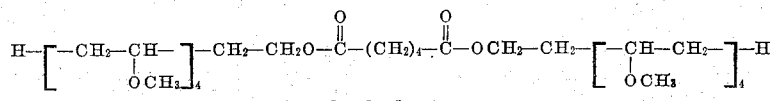

bis-3,5,7,9-tetramethoxydecyl adipate 104 parts of 3,5,7,9-tetramethoxy-1-decanol obtained as a fraction from mixture of alcohols prepared according to Example III of said aforementioned application, 22 parts of adipic acid, 100 parts of toluene, and 0.1 part of p-toluenesulfonic acid were placed in a glass reactor equipped with a constant water separator. The mixture was heated at the reflux point for 4 hours during which time the theoretical amount of water was collected. The cooled mixture was treated with dilute soda solution and washed several times with water. The water-oil mixture was allowed to separate and the heavy oil collected. There were obtained 91 parts of bis-3,5,7,9-tetramethoxydecyl adipate in a yield of 90% of the theoretical.

*Example VI*

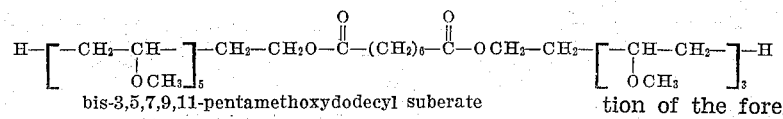

bis-3,5,7,9,11-pentamethoxydodecyl suberate 190 parts of 3,5,7,9,11-pentamethoxy-1-dodecanol (prepared according to Example IV of the said application), 44 parts of suberic acid, 150 parts of toluene, and 0.1 part of p-toluenesulfonic acid were placed in a glass reactor equipped with a constant water separator. The mixture was heated at the reflux point for 3 hours during which time the theoretical amount of water was collected. The cooled mixture was treated with dilute soda solution and the solvent distilled at reduced pressure. There were obtained 175 parts of bis-3,5,7,9,11-pentamethoxydodecyl suberate of a yield of 80% of the theoretical.

*Example VII.—3,5,x-alcohol esters of adipic acid*

300 parts of a mixture of alcohols consisting of 30% of 3,5-dimethoxy-1-hexanol, 20% of 3,5,7-trimethoxy-1-octanol, 10% of 3,5,7,9-tetramethoxy-1-decanol, and 5% of polymethoxy alcohols of the type of 3,5,7,9,x-polymethoxy alkanol, and 219 parts of adipic acid were treated as in Example V to yield a mixture of esters which were compatible with the usual cellulose ethers and esters with very low volatility and low water extractability.

*Example VIII*

Example VII was repeated with the exception that 219 parts of adipic acid were replaced by 225 parts of phthalic anhydride. The mixture of esters obtained showed excellent compatability with the usual cellulose ether and esters.

In a similar manner, esters of 3,5-dialkoxy-1-alkanols, 3,5,x-polyether-1-alkanols, and mixtures of such alkanols with o-ethylglycolic acids and mixtures of adipic, pimelic, suberic, azelaic, sebacic, hendecanedioic, and dodecanedioic acids were prepared as in the foregoing examples. The esters prepared as above are compatible with all of the previously mentioned vinyl resins, cellulose ethers and esters commercially used, such as, for example, cellulose acetate, cellulose triacetate, cellulose acetate-propionate, cellulose acetate-butyrate, cellulose nitrate, cellulose nitrate-acetate, ethyl cellulose, benzyl celulose, and the like. The esters may be incorporated into molding powders of vinyl resins, cellulose ethers and esters or into solutions which are normally prepared for films, lacquers, dopes, and laminating solutions. The concentration or amount to be used as a plasticizer will depend, of course, on the type of vinyl resin, cellulose ether or ester composition employed. The approximate amounts to be employed for any particular composition can be very readily determined by simple routine spot experiments. In general, however, the amount for molding powders may range from 20 to 40% of the powder, in solutions for films anywhere from 3 to 6%, in lacquers about 2 to 5%, in dopes from 40 to 50%, and in laminating solutions from 3 to 6%. All of these percentages are based on the weight of the vinyl resin, cellulose ether or ester composition.

The following example illustrates the application of the foregoing esters as plasticizers and the improved results obtained thereby when compared with currently used plasticizers.

*Example IX*

A film of cellulose acetate of 5 mil thickness, containing 58.4 to 59% combined acetic acid, was prepared by casting the composition given below on a clean, glass plate with a doctor blade, followed by air drying for 48 hours at room temperature at a controlled rate to prevent blushing of or other physical damage to the film. The film was then removed from the glass plate and further dried for 2 hours at 60° C. in the presence of freely circulating air.

| | Parts |
|---|---|
| Cellulose acetate (containing 58% acetic acid) | 15 |
| Dimethylphthalate | 3 |
| Methylene chloride | 50 |
| Ethylene chloride | 22 |
| Absolute ethanol | 10 |

In like manner, films of the same thickness were prepared in which the plasticizers were dimethoxyethylphthalate, butyl cellosolve stearate, bis-3-methoxybutyl adipate, and plasticizers as prepared above.

Samples of all of the films were placed in air circulating oven for 24 hours at 100° C. In another instance, samples were immersed in water at room temperature for 48 hours, removed, rinsed with distilled water, and dried for 2 hours at 60 °C. The superiority of films containing the plasticizers of this invention over similar films containing prior art plasticizers in resistance to loss of weight under this treatment is shown in Table 1.

TABLE 1

| Plasticizers | Boiling Point, °C. | Volatility, Percent Wt. Loss of Film After 24 Hours at 100° C. | Water Extraction, Percent Wt. Loss of Film After 48 Hours in Water at Room Temperature |
|---|---|---|---|
| Dimethylphthalate | 282 | 7.9 | 2.7 |
| Dimethoxyethylphthalate | 209-261/20 mm | 7.1 | 2.1 |
| Bis-3-methoxybutyl adipate | 129/0.16 mm | 10.1 | 6.9 |
| Bis-3-ethoxybutyl adipate | 154/0.1 mm | 9.3 | 1.0 |
| Bis-3-methoxybutyl sebacate | 165/0.2 mm | 7.8 | 1.5 |
| Bis-3-methoxybutyl phthalate | 160/0.2 mm | 6.1 | 1.7 |
| Bis-3-butoxybutyl phthalate | 180/0.2 mm | 5.0 | 0.5 |
| Bis-3,5-dimethoxy-hexyl sebacate | 214/0.2 mm | 2.8 | 1.2 |
| Bis-3,5-dimethoxy-hexyl phthalate | 207-210/0.3 mm | 3.1 | 1.5 |
| Bis-3,5-diethoxy-hexyl adipate | 207-208/0.45 mm | 5.1 | 2.2 |
| Bis-3,5,7,9-tetra-methoxydecyl adipate | Not distillable | 4.8 | 2.0 |
| 3:1 Alcohol esters of adipic acid [1] | Mixtures | 6.9 | 4.4 |
| 3:1 Alcohol esters of phthalic anhydride.[1] | do | 4.3 | 0.8 |

[1] 3:1 alcohols composed of the following approximate proportions:
30% 3,5-dimethoxy-1-hexanol
20% 3,5,7-trimethoxy-1-octanol
10% 3,5,7,9-tetramethoxy-1-decanol
5% higher polymethoxy alcohols of the type 3,5,7,9,x-polymethoxy-1-alkanol, as characterized by the general formula wherein $n$ represents 2 to 3.

We claim:
1. A dicarboxylic acid ester of alkoxy-1-alkanol characterized by the following formula:

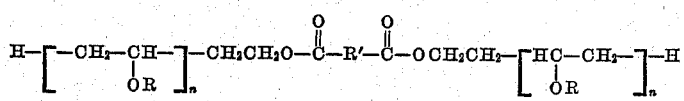

and mixtures thereof, wherein R represents a member selected from the class consisting of alkyl of not more than 6 carbon atoms, lower alkoxyalkyl in which the alkyl groups contain not more than 4 carbon atoms, phenyl, naphthyl, tolyl, and benzyl, phenethyl and menaphthyl groups, R' represents a member selected from the class consisting of polymethylene chains of from 4 to 10 carbon atoms and the cyclic hydrocarbon radicals of dicarboxylic acids of the group consisting of phenylene, diphenylene and naphthylene radicals, and $n$ represents an integer of from 2 to 10.

2. Bis-3,5-dimethoxyhexyl sebacate having the following formula:

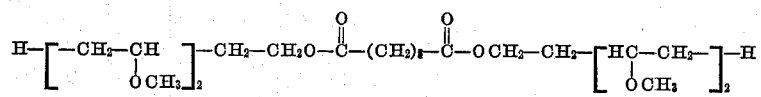

3. Bis-3,5-dimethoxyhexyl adipate having the following formula:

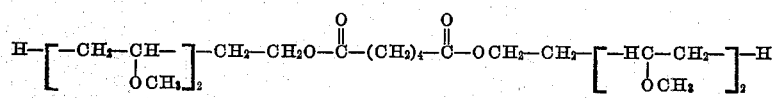

4. Bis-3,5-dibutoxyhexyl phthalate having the following formula:

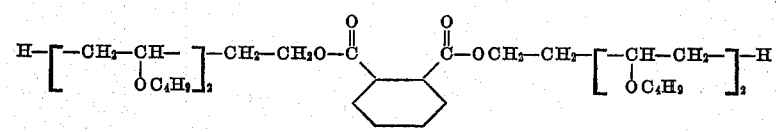

5. Bis-3,5,7-trimethoxyoctyl dodecanedioate having the following formula:

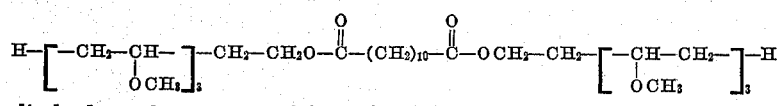

6. Bis-3,5,7,9-tetramethoxydecyl adipate having the following formula:

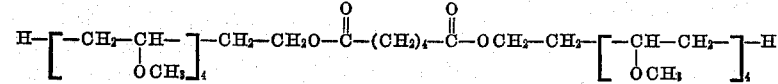

References Cited in the file of this patent

UNITED STATES PATENTS

| Number | Name | Date |
|---|---|---|
| 1,706,639 | Van Schaak et al. | Mar. 26, 1929 |
| 2,075,107 | Frazier | Mar. 30, 1937 |
| 2,302,743 | Carruthers | Nov. 24, 1942 |
| 2,349,414 | Ferrer | May 23, 1944 |
| 2,497,433 | Blake | Feb. 14, 1950 |